UNITED STATES PATENT OFFICE.

RUDOLF SCHÜLE, OF FRANKFORT-ON-THE-MAIN, GERMANY, ASSIGNOR TO CASSELLA COLOR COMPANY, OF NEW YORK, N. Y.

RED COTTON DYE AND PROCESS OF MAKING SAME.

No. 912,182.  Specification of Letters Patent.  Patented Feb. 9, 1909.

Application filed November 16, 1908. Serial No. 462,902.

*To all whom it may concern:*

Be it known that I, RUDOLF SCHÜLE, doctor of philosophy, a Swiss subject, and a resident of Frankfort-on-the-Main, Waldschmidtstrasse 26, have invented certain new and useful Improvements in the Manufacture of Red Cotton Dyestuffs, of which the following is a specification.

I have discovered that by combining one molecule of diazotized m-aminophenyl-5-oxy-1.2-naphtimidazole-7-sulfonic acid or its dihydro derivative (hereinafter called "imidazole acids") with a second molecule of imidazole acid, very valuable polyazo dyestuffs may be obtained containing a group, such as:—

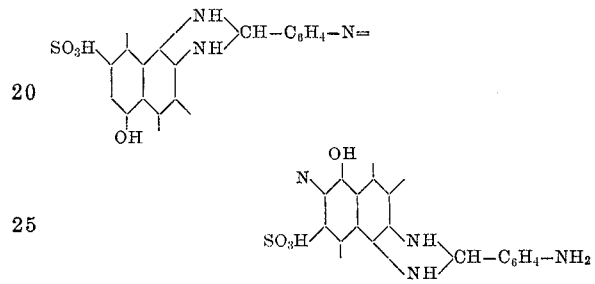

hereinafter called a "double imidazole body". This group may be formed by combining the molecules in an alkaline solution and may then be combined with one molecule of a diazo compound for instance paradiazo benzene-sulfonic acid. An easily soluble dyestuff of excellent affinity is thereby produced, whereas the dyestuff from para-diazobenzenesulfonic acid and one molecule of imidazole acid hardly stains cotton. Dyestuffs containing the double group may also be obtained by diazotizing the monoazo dyestuffs obtained from the imidazole acids, and then combining with a second molecule of imidazole acid. Now, if these disazo dyestuffs are diazotized and developed on the fiber, dyeings fast to washing are obtained which are also distinguished by their great resistance to acids. With regard to the shades of the trisazo dyestuffs so obtained on the fiber, it is remarkable that the introduction of the second molecule of the imidazole acid does not affect the brilliancy. The dyestuffs yield yellowish-red to bluish-red shades, brighter if anything than the analogous products containing but one molecule of the imidazole acid. Their tinctorial power on the other hand is considerably enhanced in consequence of the increased number of the azo groups.

The process is illustrated by the following example:—

Example:—19.9 kilos of the sodium salt of sulfanilic acid are diazotized with 36 kilos hydrochloric acid of 21° Bé. and 7 kilos sodium nitrite. The diazo compound is introduced into a solution, brought to 0° C. by the addition of ice, of 38 kilos m-aminophenyl-5-oxy-1.2-dihydronaphthimid-azole-7-sulfonic acid, dissolved with 40 kilos anhydrous carbonate of soda. After two hours it is heated to 70° C., the dyestuff salted out and filtered off. For further diazotation, the dyestuff is stirred to a paste with water. The suspension is cooled with ice to 0° C., and 48 kilos hydrochloric acid of 21° Be. and 7 kilos sodium nitrite are added. The diazo compound is formed after about 5 to 6 hours. It is introduced into a solution of 38 kilos m-aminophenyl-5-oxy-1.2-dihydronaphtimida-zole-7-sulfonic acid and 40 kilos anhydrous carbonate of soda. After heating a short time the coloring matter is salted out. The dyestuff is filtered off and dried. It forms a brown powder, dissolving in water with a brilliant red color. In concentrated sulfuric acid it dissolves with a bluish-red color. It dyes cotton scarlet shades, and such dyeings when developed with beta naphthol yield scarlet red shades. If in this example for the sulfanilic acid there be substituted o-toluidin-p-sulfonic acid, o-anisidin-p-sulfonic acid or betanaphtylamin-sulfonic acids, dyestuffs of a more bluish shade are obtained, which when developed with beta naphthol, yield in a like manner considerably more bluish shades than are obtained with the sulfanilic acid dyestuffs under the same conditions.

Having now particularly described and ascertained the nature of my said invention and in what manner the same is to be performed, I declare that what I claim is:—

1. The manufacture of azo compounds by combining one molecule of diazotized imidazolacid with a second molecule of imidazol acid substantially as described.

2. The manufacture of azo compounds by diazotizing a monoazo compound of an imidazol acid and combining with a second molecule of imidazol acid substantially as described.

3. The manufacture of dyestuffs by reacting with a diazo compound on a double imidazol body substantially as described.

4. The new dyestuff of the constitution $$R - N = N - \text{imidazolacid} - N = N - \text{imidazolacid}$$

which is a brown powder dissolving in water with a red color, in concentrated sulfuric acid with a bluish-red color, dyeing cotton scarlet shades and such dyeings, when developed with beta naphthol, yielding scarlet red shades substantially as described.

In witness whereof I have hereunto signed my name this 26th day of October 1908, in the presence of two subscribing witnesses.

RUDOLF SCHÜLE.

Witnesses:
JEAN GRUND,
CARL GRUND.